United States Patent
Safai (10) Patent No.: US 11,474,052 B2
(45) Date of Patent: *Oct. 18, 2022

(54) REAL TIME ADDITIVE MANUFACTURING PROCESS INSPECTION USING X-RAY EMISSION AND DETECTION THROUGH A BUILD CHAMBER

(71) Applicant: The Boeing Company, Chicago, IL (US)

(72) Inventor: Morteza Safai, Newcastle, WA (US)

(73) Assignee: THE BOEING COMPANY, Chicago, IL (US)

( * ) Notice: Subject to any disclaimer, the term of this patent is extended or adjusted under 35 U.S.C. 154(b) by 682 days.

This patent is subject to a terminal disclaimer.

(21) Appl. No.: 16/243,606

(22) Filed: Jan. 9, 2019

(65) Prior Publication Data

US 2020/0217807 A1 Jul. 9, 2020

(51) Int. Cl.
*G01N 23/18* (2018.01)
*B33Y 50/00* (2015.01)
(Continued)

(52) U.S. Cl.
CPC ............ *G01N 23/18* (2013.01); *B22F 10/20* (2021.01); *B29C 64/393* (2017.08); *B33Y 10/00* (2014.12);
(Continued)

(58) Field of Classification Search
CPC .. G01N 23/18; G01N 23/04; G01N 2223/615; G01N 2223/5015;
(Continued)

(56) References Cited

U.S. PATENT DOCUMENTS

2015/0231831 A1* 8/2015 El-Siblani ............. B29C 64/241
264/401
2017/0310935 A1* 10/2017 Sinclair ................. B29C 64/245
(Continued)

FOREIGN PATENT DOCUMENTS

CN 205416403 U 8/2016

OTHER PUBLICATIONS

Gulmay, High-Voltage X-ray tubes specification sheets, Feb. 12, 2018, retrieved from archive.org internet URL: <https://web.archive.org/web/20180212094031/http://www.gulmay.com:80/x-ray-tubes/high-power-x-ray-tubes/> (Year: 2018).*
(Continued)

*Primary Examiner* — Kenneth M Lo
*Assistant Examiner* — Jonathan Michael Skrzycki
(74) *Attorney, Agent, or Firm* — MH2 Technology Law Group LLP (57) ABSTRACT

Systems and methods for real time, nondestructive inspection of an object being formed by additive manufacturing is provided. The disclosed systems and methods can be used with any additive manufacturing system and can detect defects introduced during fabrication. In operation, additive manufacturing of the object can be paused and the object rotated within the build chamber. An x-ray pulse can then be directed through a linear aperture towards the object being formed inside the build chamber. A linear x-ray detector array can detect the x-ray pulse and an x-ray image of the object being formed can be created. By rotating the object being formed during exposure to the x-ray pulse at least one half of one full rotation, the entire volume of the object can be inspected.

27 Claims, 5 Drawing Sheets

(51) Int. Cl.
*B33Y 10/00* (2015.01)
*B33Y 50/02* (2015.01)
*G01N 23/04* (2018.01)
*B22F 10/20* (2021.01)
*B33Y 30/00* (2015.01)
*B29C 64/393* (2017.01)
*B22F 10/30* (2021.01)

(52) U.S. Cl.
CPC ............... *B33Y 30/00* (2014.12); *B33Y 50/00* (2014.12); *B33Y 50/02* (2014.12); *G01N 23/04* (2013.01); *B22F 10/30* (2021.01)

(58) Field of Classification Search
CPC ........... G01N 2223/646; G01N 23/046; G01N 2223/03; G01N 2223/1016; G01N 2223/306; B33Y 50/00; B33Y 30/00; B33Y 10/00; B33Y 50/02; B29C 64/393; B22F 10/20; B22F 10/30; B22F 2999/00; Y02P 10/25
See application file for complete search history.

(56) References Cited

U.S. PATENT DOCUMENTS

| | | | |
|---|---|---|---|
| 2018/0045660 A1* | 2/2018 | Yashima | G01N 23/083 |
| 2018/0071987 A1* | 3/2018 | Tsumuraya | B22F 10/20 |
| 2019/0021689 A1* | 1/2019 | Hirose | A61B 6/588 |
| 2019/0193156 A1* | 6/2019 | Yang | B22F 10/20 |
| 2020/0353684 A1* | 11/2020 | Dudley | B29C 64/10 |

OTHER PUBLICATIONS

Spellman, Common X-ray tube failure modes, Sep. 6, 2017, retrieved from archive.org Internet URL: <https://web.archive.org/web/20170906132103/https://www.spellmanhv.com/en/Technical-Resources/Application-Notes-X-Ray-Generators/AN-02> (Year: 2017).*

Merriam-webster online dictionary, taken from the internet on Nov. 18, 2021, URL<https://www.merriam-webster.com/dictionary/length> (Year: 2021).*

Extended European Search Report dated Mar. 13, 2020 in corresponding European Application No. 20150787.8, 11 pages.

Thompson et al., "X-ray Computed Tomography for Additive Manufacturing: A Review," Measurement Science and Technology, 27 (2016) 072001, 17 pages.

* cited by examiner

REAL TIME ADDITIVE MANUFACTURING PROCESS INSPECTION USING X-RAY EMISSION AND DETECTION THROUGH A BUILD CHAMBER

FIELD

The present disclosure generally relates to methods and systems for additive manufacturing and, more particularly, to methods and systems for real time inspection during additive manufacturing.

BACKGROUND

Additive manufacturing, also called three dimensional (3-D) printing, encompasses many methods to "print" three dimensional objects by depositing layer upon layer of material and fusing them together. The technology has progressed so that complex industrial end-use parts can now be fabricated. Additive manufacturing techniques include, among others, directed energy deposition, binder jetting, material extrusion, powder bed fusion, sheet lamination, material jetting, and vat photo polymerization. Directed energy deposition, for example, precisely deposits a layer of material, such as a powdered metal layer. During deposition, a laser or electron beam thermally fuses the powdered metal. By continuing to precisely deposit powdered metal layers and fusing them together, a desired 3-D object or component can be fabricated within a build chamber.

Because additive manufacturing can be used to fabricate final end use parts, it has become an important alternative to machining, casting, and injection molding. It can be used for the production of metal, composite, and polymer components for the most demanding of applications. As with any manufacturing process, undesirable internal defects such as voids, cracks, and porosity may sometimes be introduced during fabrication. Detection of these defects, however, must wait for completion of the additive manufacturing process. Using nondestructive methods such as computer tomography or ultrasonic techniques, defects in a completed object fabricated by additive manufacturing can be detected.

SUMMARY

According to the present teachings, a method for detecting defects during additive manufacturing is provided. The method includes pausing additive manufacturing of an object within a build chamber at a time $T_1$, wherein $T_1$ is subsequent to a time $T_0$ and prior to a time $T_F$, wherein time $T_0$ is a start of additive manufacturing of the object being formed and time $T_F$ is a completion of additive manufacturing of the object being formed in the build chamber. The method further includes rotating the object in the build chamber and directing an x-ray pulse from an x-ray tube through a linear aperture towards the object being formed and being rotated inside of the build chamber. A linear x-ray detector array then detects the x-ray pulse subsequent to the x-ray pulse's interaction with the object being formed and being rotated. The method further includes creating an x-ray image of the object being formed based on the detected x-ray pulse.

According to the present teachings, the method for detecting defects during additive manufacturing can further include analyzing the x-ray image of the object being formed to determine a presence of a defect and stopping additive manufacturing of the object being formed, prior to time $T_F$, based on the presence of the defect.

According to the present teachings, the method for detecting defects during additive manufacturing can further include analyzing the x-ray image of the object being formed to determine that defect is not present and resuming additive manufacturing of the object being formed.

According to the present teachings, the method for detecting defects during additive manufacturing can further include pausing additive manufacturing of an object within a build chamber at a time $T_2$, wherein time $T_2$ is subsequent to time $T_1$ and prior to a time $T_F$. Then, directing a second x-ray pulse, at time $T_2$, towards the object being formed inside of the build chamber while rotating the object being formed. The method can further include detecting the second x-ray pulse, by the linear x-ray detector array, subsequent to the second x-ray pulse's interaction with the object being formed and creating a second x-ray image of the object being formed based on the detected second x-ray pulse.

According to the present teachings, the method for detecting defects during additive manufacturing can further include pausing additive manufacturing of an object within a build chamber at a time $T_N$, wherein time $T_N$ is subsequent to time $T_2$ and prior to a time $T_F$, wherein N is an integer greater than 2; directing an $N^{th}$ x-ray pulse, at time $T_N$, towards the object being formed inside of the build chamber while rotating the object being formed. The method can also include detecting the $N^{th}$ x-ray pulse, by the linear x-ray detector array, subsequent to the $N^{th}$ x-ray pulse's interaction with the object being formed and creating another x-ray image of the object being formed based on the detected $N^{th}$ x-ray pulse.

According to the present teachings, another method for detecting defects during additive manufacturing is provided. The method includes pausing additive manufacturing of an object within a build chamber at a time $T_1$, wherein $T_1$ is subsequent to a time $T_0$ and prior to a time $T_F$, wherein time $T_0$ is a start of additive manufacturing of the object being formed and time $T_F$ is a completion of additive manufacturing of the object being formed in the build chamber. The object in the build chamber can be moved linearly in a direction perpendicular to an linear aperture and a linear x-ray detector, wherein the linear aperture and the linear x-ray detector are disposed outside of the build chamber. An x-ray pulse can be directed from an x-ray tube through the linear aperture towards the object being formed and moved inside of the build chamber to scan the object being formed. The x-ray pulse can be detected by a linear x-ray detector array, subsequent to the x-ray pulse scanning the object being formed. And an x-ray image of the object being formed can be created based on the detected x-ray pulse.

According to the present teachings, an inspection system for additive manufacturing is provided. The inspection system includes an actuator, wherein the actuator is arranged in a build chamber to support an object being formed by additive manufacturing; an x-ray tube disposed adjacent to a side of the turntable and outside of the build chamber; a linear aperture disposed between the x-ray tube and the build chamber; and a linear x-ray detector array disposed at an opposite side of the turntable from the x-ray tube and outside of the build chamber. The inspection system for additive manufacturing further includes a computer and an image analyzer comprising a memory system having one or more non-transitory computer readable media storing instructions that, when executed, causes the image analyzer to form an x-ray image from signals received from the linear x-ray detector array.

According to the present teachings, another inspection system for additive manufacturing is provided. The inspection system includes an x-ray tube disposed adjacent to a side and outside of a build chamber; an aperture disposed between the x-ray tube and the build chamber, wherein the x-ray tube and the aperture are attached to an x-ray tube actuator arranged to move the x-ray tube and the aperture relative to the build chamber; and a linear x-ray detector array disposed at an opposite side of the build chamber from the x-ray tube and outside of the build chamber, wherein the linear x-ray detector array is attached to a linear x-ray detector array actuator arranged to move the linear x-ray detector array relative to the build chamber. The inspection system for additive manufacturing further includes a computer and an image analyzer comprising a memory system having one or more non-transitory computer readable media storing instructions that, when executed, causes the image analyzer to form an x-ray image from signals received from the linear x-ray detector array.

According to the present teachings, another method for detecting defects during additive manufacturing is provided. The method includes pausing additive manufacturing of an object within a build chamber at a time $T_1$, wherein $T_1$ is subsequent to a time $T_0$ and prior to a time $T_F$, wherein time $T_0$ is a start of additive manufacturing of the object being formed and time $T_F$ is a completion of additive manufacturing of the object being formed in the build chamber. The method further includes moving an x-ray tube and a linear x-ray detector array in linear and synchronized manner, wherein the x-ray tube and the linear x-ray detector array are disposed outside of the build chamber. An x-ray pulse can then be directed from the x-ray tube through a linear aperture towards the object being formed to scan the object being formed. The x-ray pulse can be detected by the linear x-ray detector array, subsequent to the x-ray pulse scanning the object being formed and an x-ray image of the object being formed can be created based on the x-ray pulse that was detected.

According to the present teachings, another method for detecting defects during additive manufacturing is provided. The method includes pausing additive manufacturing of an object within a build chamber at a time $T_1$, wherein $T_1$ is subsequent to a time $T_0$ and prior to a time $T_F$, wherein time $T_0$ is a start of additive manufacturing of the object being formed and time $T_F$ is a completion of additive manufacturing of the object being formed in the build chamber. The method further includes rotating one of an x-ray tube and a linear x-ray detector array and moving in an arc the other of the x-ray tube and the linear x-ray detector array to maintain a distance between the linear x-ray detector array and the x-ray tube, wherein the x-ray tube and the linear x-ray detector array are disposed outside of the build chamber. An x-ray pulse can be directed from the x-ray tube through a linear aperture towards the object being formed to scan the object being formed. The x-ray pulse can be detected by the linear x-ray detector array, subsequent to the x-ray pulse scanning the object being formed and an x-ray image of the object being formed can be created based on the x-ray pulse that was detected.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate the present disclosure and together with the description, serve to explain the principles of the present disclosure.

DESCRIPTION

Reference will now be made in detail to exemplary implementations of the present disclosure, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary implementations in which the present disclosure may be practiced. These implementations are described in sufficient detail to enable those skilled in the art to practice the present disclosure and it is to be understood that other implementations may be utilized and that changes may be made without departing from the scope of the present disclosure. The following description is, therefore, merely exemplary.

Currently, additively manufactured objects must complete fabrication and be removed from the build chamber before they can be inspected. Continuing fabrication of an object with an internal defect, however, wastes time, material, and money. Removing the object from the build chamber prior to completion of fabrication for inspection, however, is difficult and time consuming. In some additive manufacturing methods, such as those that require an inert atmosphere or vacuum in the build chamber, removing the object prior to completion cannot be done without irreparable damage to the object. Furthermore, the build chamber can contain smoke, particles, and liquids that can impeded even visual inspection during additive manufacturing. Implementations of the present disclosure address the need for a system and method to nondestructively inspect an object in real time as it is being fabricated by additive manufacturing.

The disclosed x-ray based system and method can nondestructively detect defects within an object in real time, as the object is being fabricated, by additive manufacturing. Inspection can be accomplished without needing to modify or otherwise disrupt the environment inside the build chamber, for example a vacuum, inert gas, or elevated temperature environment. Being x-ray based, the disclosed system and method is not limited by the type and size of the build chamber or the type of additive manufacturing technique being used. Moreover, the disclosed system and method is not affected by smoke, particles, or liquid that may be present in the build chamber. Real time detection of defects during additive manufacturing can save time, material, and money by stopping or correcting the process immediately upon detection of a defect instead of waiting until completion of the additive manufacturing process.

Figure 1:
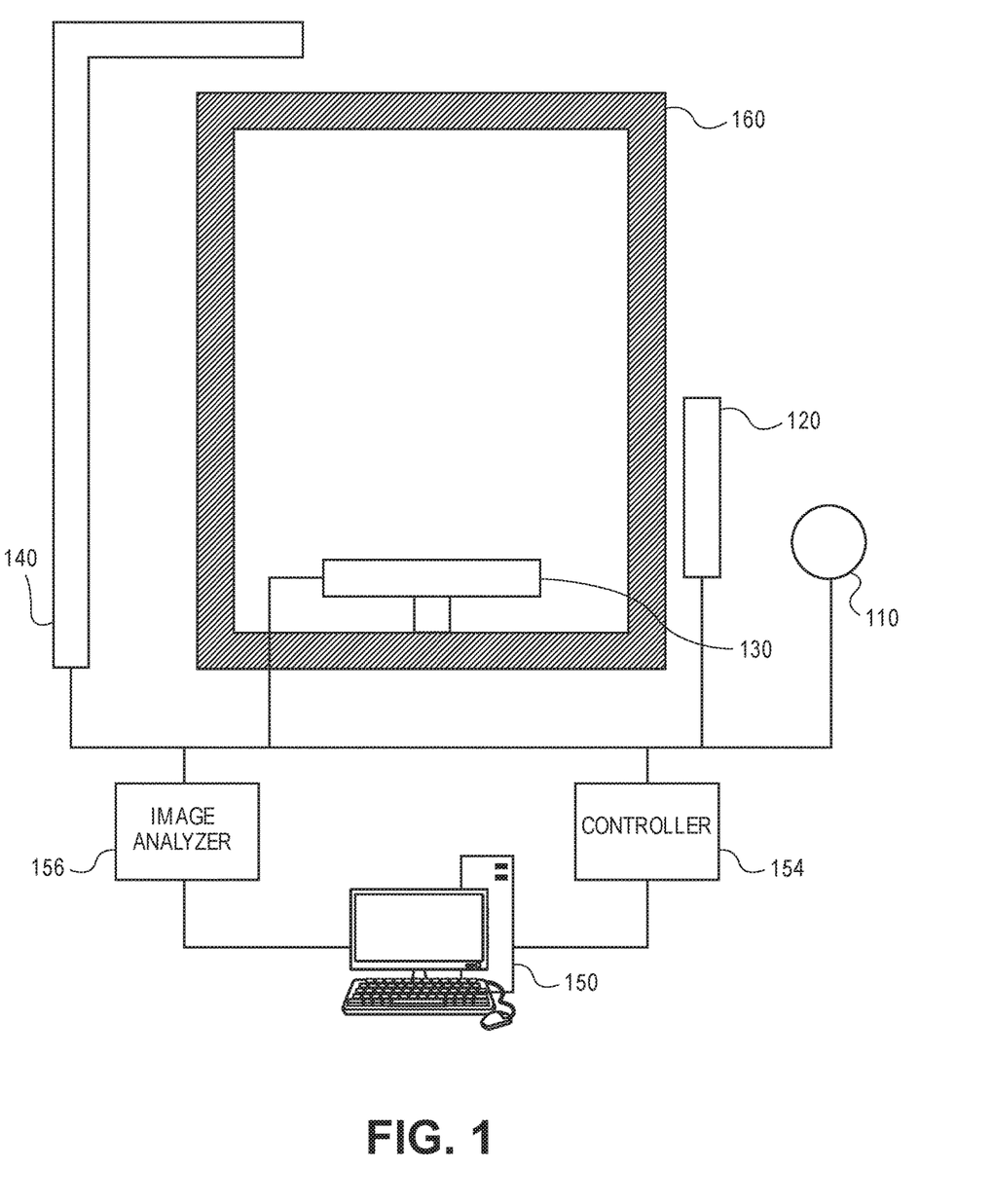
FIG. 1 schematically depicts a system for real time inspection of an object during additive manufacturing of the object according to the present disclosure.

FIG. 1 shows an inspection system 100 that can be used during additive manufacturing, according to the present disclosure. Inspection system 100 can include an x-ray tube 110, an aperture 120, an actuator 130, a linear x-ray detector array 140, a computer 150, a controller 154, and an image analyzer 156.

X-ray tube 110 is positioned adjacent to and outside of a build chamber 160. X-ray tube 110 can be, for example, an x-ray tube used for baggage screening in airports. The type of x-ray tube 110 can depend on the objected being additively manufactured, its composition, and the type of additive manufacturing technique being used. For example, x-ray tube 110 can be glass or ceramic and have power ranging from about 100 to about 4000 watts and voltages ranging from about 30 to about 450 kV. Suitable x-ray tubes are manufactured by, for example, Phillips, Varian, and General Electric. X-ray tube 110 further includes a cooling system, for example, circulating water or closed cycle cooling to control the temperature of the x-ray tube.

Aperture 120 is positioned between build chamber 160 and x-ray tube 110 to provide a collimated fan beam directed to an object being fabricated inside of build chamber 160. Aperture 120 can be formed of any material that blocks x-rays, including but not limited to lead, steel, and tungsten. Aperture 120 is controlled by controller 154 to provide pulses of about 1 second to about 60 seconds directed at an object being fabricated inside of build chamber 160. Aperture 120 can be, for example, a linear aperture formed of lead or steel.

Actuator 130 is disposed within a build chamber 160 and either directly or indirectly supports the object being fabricated. Actuator 130 can be a rotary actuator, such as a turntable, that rotates under the control of controller 154, at a speed from about one revolution per second to about one revolution per 10 minutes. This allows the x-ray pulse to interact with the entire volume of the object being fabricated. Actuator 130 can be a motorized turntable with an optical encoder that provides accurate positioning so the x-ray image can correlate to the positon of the object being formed inside of build chamber 160. Alternatively, actuator 130 can be a linear actuator that supports and moves the object being fabricated in a linear direction, for example, into and out of the page, as shown in FIG. 1. The linear actuator can move under the control of controller 154 at a speed from about 100 cm/sec to about 1 cm/minute to allow the x-ray pulse to interact with the entire volume of the object being fabricated. For example, the linear actuator can move the object being fabricated so that the entire volume of the object is scanned by the x-ray pulse.

Linear x-ray detector array 140 is positioned outside of build chamber 160 to detect the x-ray pulse after it passes through and interacts with an object being fabricated on actuator 130. Linear x-ray detector array 140 can be, for example, a one-dimensional x-ray detector consisting of at least one row of x-ray sensitive detectors. Data from linear x-ray detector array 140 is digitized and sent to a computer 150 and analyzed by image analyzer 156. By moving either the object being fabricated or the detector in a direction perpendicular to the length of linear x-ray detector array 140, a two dimensional image of the object can be created. As shown in FIG. 1, actuator 130 is a turntable that rotates the object being fabricated in a direction perpendicular to the length dimension of linear x-ray detector array 140. Linear x-ray detector array 140 can be, for example, a silicon (Si) or complementary metal-oxide-semiconductor (CMOS) based detector with scintillating materials on top. Scintillating materials can be, for example, CsI:Na, $Gd_2O_2S$, or $CaWO_4$, to convert x-rays to visible light. In the case where actuator 130 is a linear actuator, the linear actuator moves the object being fabricated in a direction into and out of the page, so that the entire volume of the object being fabricated is scanned by the linear x-ray pulse and the x-rays are detected by linear x-ray detector array 140 subsequent to the x-rays interacting with the object being fabricated.

Inspection system 100 further includes computer 150, controller 154, and image analyzer 156. Computer 150 is operably coupled to x-ray tube 110, aperture 120, actuator 130, and linear x-ray detector array 140. Computer 150 includes processors and a memory system including one or more non-transitory computer readable media storing instructions that, when executed, synchronizes actions by x-ray tube 110, aperture 120, actuator 130, and linear x-ray detector array 140. In particular, computer 150, through controller 154, synchronizes via processors and software, the rotation or linear movement of actuator 130 with the exposure time of linear x-ray detector array 140 to maintain regular image geometry. This provides accurate positioning so the x-ray image can correlate with the position of the object being formed for pinpointing the defect location. This also allows accurate determination of when failure occurs in the additive manufacturing process. Controller 154 further controls aperture 120 to provide an x-ray pulse having the desired pulse width and controls operation of x-ray tube 110 to provide the desired energy.

Image analyzer 156 can include, for example, software to create x-ray images from data received from linear x-ray detector array 140. Image analyzer 156 can further include software to identify defects in the x-ray images, for example, pattern recognition software that compares the x-ray images to defect-free x-ray images. For example, by comparing an x-ray image of the object being formed to an x-ray image of a defect free object, the pattern recognition software can identify anomalies or defects, such as unplanned voids or inconsistencies, in the x-ray image of the object being formed. One of ordinary skill in the art will understand that other components may be included in inspection system 100. For example other software/devices can be used to capture, manipulate, analyze, and display the x-ray images or to control other devices such as the hardware related to the additive manufacturing system including build material deposition and fusing.

Build chamber 160, shown in cross section in FIG. 1, is generally part of an additive manufacturing system. It can take on many forms depending on the type of additive manufacturing technique, but is generally an enclosure in which additive manufacturing occurs. Build chamber 160 can range from a simple glass or polymer enclosure to a complex enclosure in which temperature and/or pressure and/or atmospheric content is tightly controlled. An advantage of the disclosed system and method, is that it is independent of the type of build chamber because x-rays can penetrate most materials.

Figure 2:
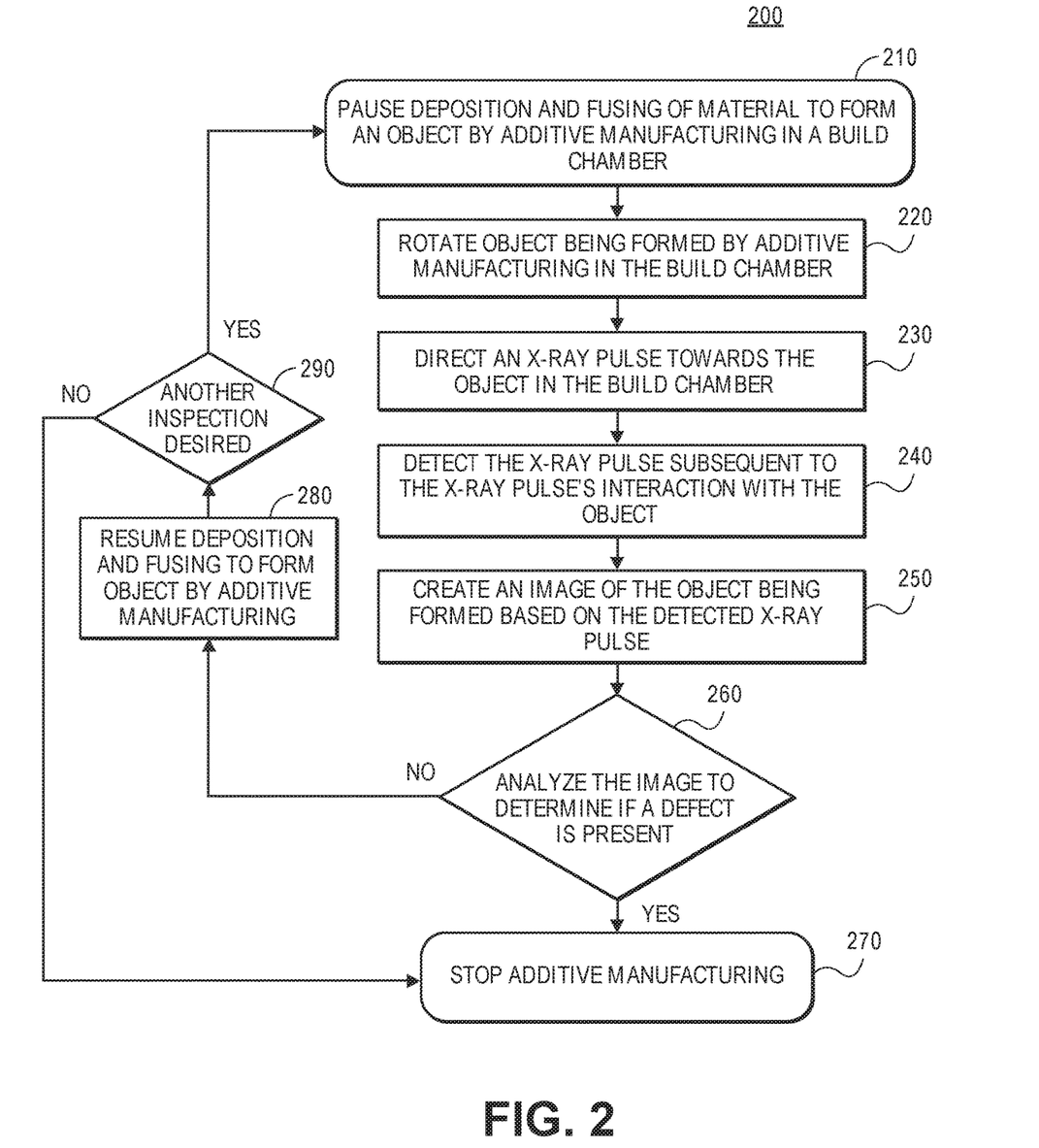
FIG. 2 illustrates operations performed in a method for real time inspection of an object during additive manufacturing of the object according to the present disclosure.

FIG. 2 shows a method 200 for nondestructive inspection of an object during fabrication by additive manufacturing according to the present disclosure. Method 200 is described herein with respect to a metal powder fed additive manufacturing system 301 shown in FIG. 3. Metal powder fed additive manufacturing systems are also known as laser cladding, directed energy deposition, and laser metal deposition systems. One of ordinary skill in art will understand that reference to metal powder fed system 301 is for descriptive purposes and that the disclosed system and method can be used in other types of additive manufacturing systems and is not limited to additive manufacturing of metal objects.

Figure 3:
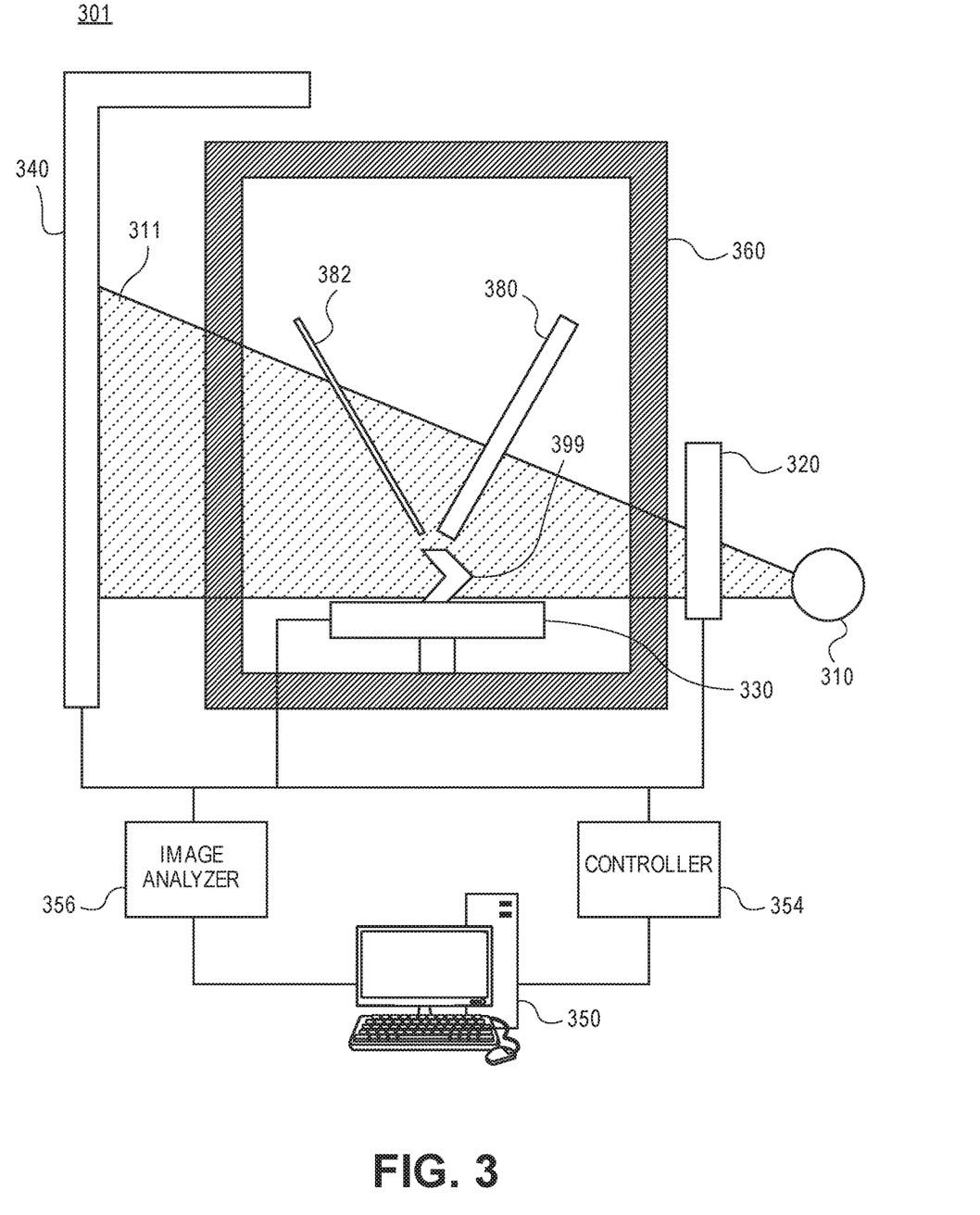
FIG. 3 schematically depicts a system for real time inspection of a metal object during additive manufacturing of the metal object by directed energy deposition according to the present disclosure.

At 210 of method 200 shown in FIG. 2, deposition and fusing of material to form an object by additive manufacturing is paused. FIG. 3 shows a metal powder fed additive manufacturing system 301 including a build chamber 360, a metal powder feeder 380, and a laser beam 382. During additive manufacturing, metal powder feeder 380 deposits metal powder while laser beam 382 fuses the metal powder at the surface of an object 399 being formed layer by layer. Metal powder feeder can include, for example, a nozzle mounted on a 4 or 5 axis arm. The type of laser can depend on the powdered metal being deposited. Because directed energy deposition systems often require an inert atmosphere, access to build chamber 360 during fabrication by additive manufacturing is limited.

Real time, nondestructive inspection of object 399 during additive manufacturing by metal powder fed system 301 can be accomplished by incorporating an x-ray tube 310, a linear aperture 320, an actuator 330, a linear x-ray detector array 340, a computer 350, a controller 354, and image analyzer 356. Additive manufacturing systems, for example metal powder fed system 301 used for descriptive purposes herein, may already include a computer and controller that can be utilized. One of ordinary skill in the art will understand that software or hardware components may need to be added to the existing computer and controller of the additive manufacturing system to incorporate control of x-ray tube 310, linear aperture 320, actuator 330, and/or linear x-ray detector array 340. Alternatively, another computer and controller, separate from the computer and controller of the additive manufacturing system, can be used.

At 210 of method 200, metal powder feeder 380 pauses depositing metal powder and fusing by laser beam 382, for example by turning off the laser that provides laser beam 382 or redirecting laser beam 382 away from object 399. Build chamber 360 does not need to be opened, the environment inside does not need to be changed, and object 399 does not need to be removed from the build chamber. This can minimize the amount of time the additive manufacturing process is paused. Pausing the additive manufacturing process can be simply stopping deposition and fusing of the build material for a brief period of time, for example, after formation of one layer and prior to formation of the next layer. When to pause the additive manufacturing process can be determined based on a number of factors including, but not limited to, the size and complexity of the object being fabricated, the number of inspections desired, and the type of additive manufacturing being used. For example, pausing at 210 can occur subsequent to fabrication of a complex portion of object 399 but prior to completion of fabrication of object 399.

At 220 of method 200, actuator 330, such as a turntable, rotates object 399 in a direction perpendicular to a length dimension of linear x-ray detector array 340. Controller 354 can control the speed of rotation, as well as the start and stop of the rotation. Rotation of actuator 330 can begin either before, during, or after x-rays interact with object 399. The speed of rotation can depend on the size of object 399 and/or the x-ray pulse width and can range from about one revolution per second to about one revolution per 10 minutes.

Where actuator 330 is a linear aperture, actuator 330 moves object 399 in a linear direction perpendicular and between linear x-ray detector array 340 and x-ray tube 310. Controller 354 can control the linear speed, as well as the start and stop of the linear motion. Movement of object being formed 399 by actuator 330 can begin either before, during, or after x-rays interact with object 399. The speed of movement can depend on the size of object 399 and/or the x-ray pulse width and can range from about 100 cm/sec to about 1 cm/min.

At 230 of method 200, an x-ray pulse is directed towards object 399. The x-ray pulse can occur at a time $T_1$. Time $T_1$ is subsequent to a time $T_0$ and prior to a time $T_F$, wherein time $T_0$ is a start of additive manufacturing of object 399 and time $T_F$ is a completion of additive manufacturing of object 399 within build chamber 360. Referring to FIG. 3, x-rays are generated by x-ray tube 310. Linear aperture 320, under the control of controller 354, provides a collimated fan shaped x-ray pulse that interacts with object 399 as it is being rotated by actuator 330. The x-ray pulse can have a pulse duration of about 1 second to about 60 seconds and an energy of about 50 to about 250 keV. Current can range from about 1 to about 20 mA. The x-ray pulse duration allows x-rays to interact with the object being formed as the object is being rotated or moved linearly. Factors influencing pulse width include the size of the object being formed and the speed of rotation or linear movement. Typically, a larger object or slower rotation or movement will require a longer pulse width. Energy and current of the x-ray pulse are determined by the size and composition of the object being formed so that the x-rays can penetrate the object being formed and the build chamber before being detected. Linear aperture 320 provides a collimated fan beam having a narrow width. The collimated fan beam can further have a length, for example, long enough to inspect object 399 at its largest dimensions when fabrication is completed. The path and pulse shape of the x-ray pulse are depicted in FIG. 3 as an x-ray pulse 311.

At 240 of method 200, x-ray pulse 311 is detected by linear x-ray detector array 340. The speed of actuator 330 moving object 399 and the pulse width of x-ray pulse 311 allow linear x-ray detector array 340 to detect the x-ray subsequent to interaction with an entire volume of object 399. For example, where actuator 330 is a turntable, the turntable can rotate object 399 one half turn to allow x-ray pulse 311 to interact with object 399. As used herein, one half turn refers to object 399 rotating one half of one full rotation with respect to turntable or object 399. Because x-rays will pass completely through object 399, the one half turn will allow x-ray pulse 311 to interact with the entire volume of object 399. In another example, actuator 330 can rotate object 399 one full turn or more. The data collected by linear x-ray detector array 340 is sent to computer 350. At this point, controller 354 under the direction of computer 350 can stop rotation of actuator 330. Controller 354 controls actuator 330, whether a turntable or linear actuator, so that object 399 is at the same position after rotation or linear movement. In other words, controller 354 returns object 399 to the same position relative to metal powder feeder 380 and laser beam 382 so that additive manufacturing can continue.

At 250 of method 200, an x-ray image is created based on the x-rays detected by linear x-ray detector array 340. Using signals provided by linear x-ray detector array 340, an x-ray image representing a volume of object 399 can be created. The x-ray image can be, for example, a digital image created by image analyzer 356. The x-ray image is analyzed at 260 of method 200 by image analyzer 356. For example, image analyzer 356 can use pattern recognition to compare the x-ray image of object 399 to control image, for example, an x-ray image of an object with no defects. Defects of about 1 mm and larger can be detected.

If a defect is detected in object 399, additive manufacturing can be stopped at 270. Stopping the additive manufacturing process at this point, prior to completion of fabrication, can save time, material, and cost.

If a defect is not detected in object 399, the additive manufacturing can resume fabrication of object 399, as shown at 280 of method 200. Referring to FIG. 3, resuming additive manufacturing means that actuator 330, for example, the turntable, under the direction of controller 354, has stopped rotating and metal powder feeder 380 begins to deposit metal powder while laser beam 382 fuses the metal powder at the surface of object 399. One of ordinary skill in the art will understand that fabrication can resume at any time after detection of the x-rays by linear x-ray detector array 340. In other words, additive manufacturing can resume before completion of the analysis of whether a defect exists.

At 290 of method 200, fabrication of object 399 can continue to completion. If another inspection is desired, for example at a time $T_2$, where $T_2$ is subsequent to time $T_1$ and prior to time $T_F$, fabrication of object 399 can again be paused and can return to 210 of method 200 as shown in FIG. 2. Operations 210 thru 260 of method 200 can then be repeated as desired or until fabrication is complete. In other words, between time $T_0$ and $T_F$ and subsequent to $T_2$, x-rays can be directed at object 399 and x-ray images created as many times as desired. For example, subsequent to time $T_2$ and prior to time $T_F$, x-rays can be directed at object 399 and x-ray images created at a time $T_N$ where time $T_N$ is an integer greater than 2. For small or non-complex shapes, only one inspection may be desired. For a large or complex shape and/or for an object formed of expensive build materials, the additive manufacturing process can be paused and the object inspected, for example, 10 times so that 10 x-ray images are formed at times $T_1$ thru $T_{10}$, respectively. Furthermore, when during the fabrication process each of the pauses occurs can also be determined as desired. For example, $T_1$ (or $T_N$) can be set to occur after fabrication of a particularly complex portion of object 399. Additionally, the timing of multiple pauses of the additive manufacturing process and inspection of the object does not have to be evenly spaced and can occur any time during fabrication.

As disclosed herein, some or all of method 200 can be advantageously automated. For example, resuming or stopping the additive manufacturing process is accomplished without an operator by using, for example, computer 350, controller 354, and image analyzer 356. Determining whether a defect exists using image processing and pattern recognition software can increase consistency of results. If desired, however, a trained technician can be used to perform the inspection and/or determination of whether a defect exists.

Figure 4:
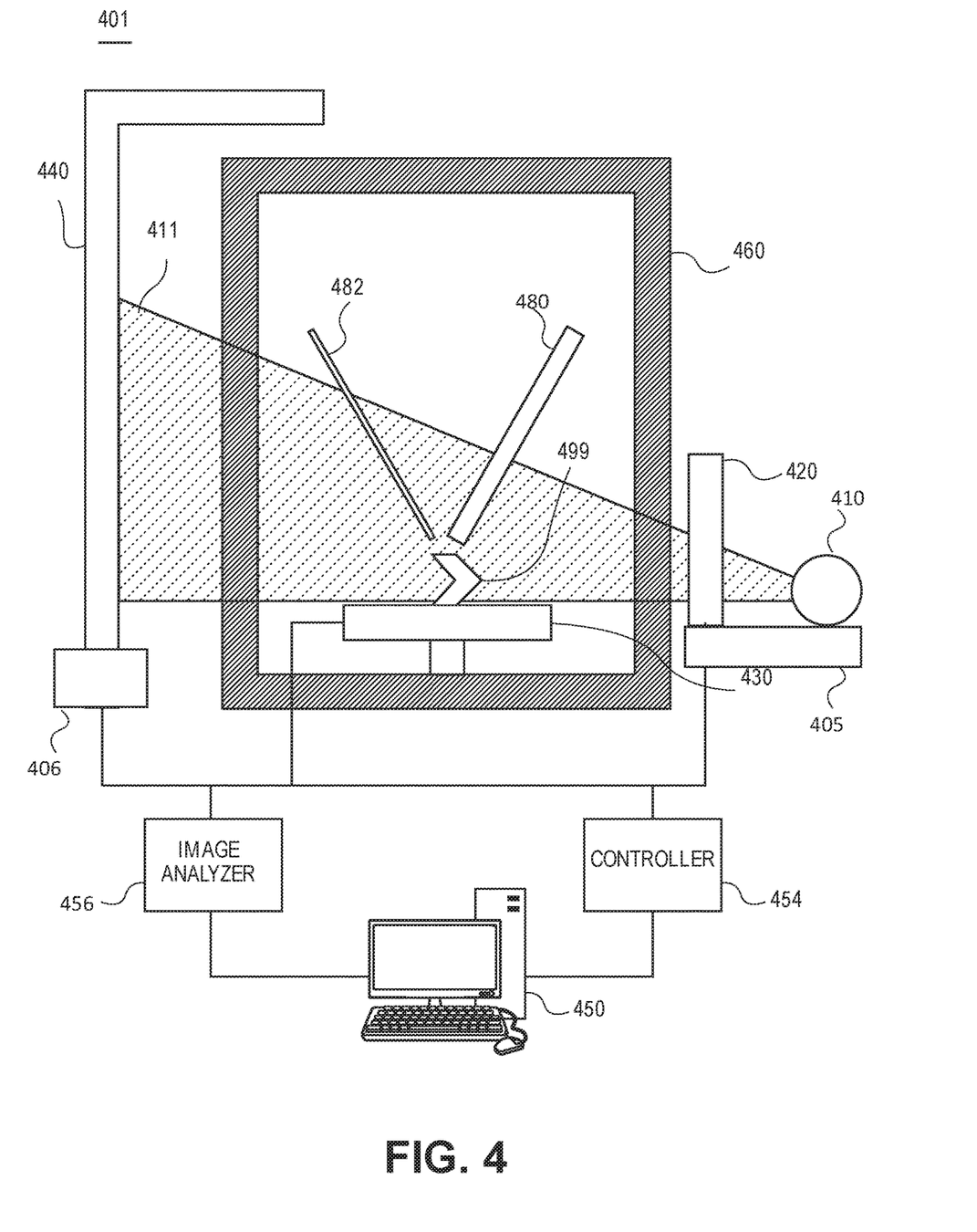
FIG. 4 schematically depicts another system for real time inspection of a metal object during additive manufacturing of the metal object by directed energy deposition according to the present disclosure.
Figure 5:
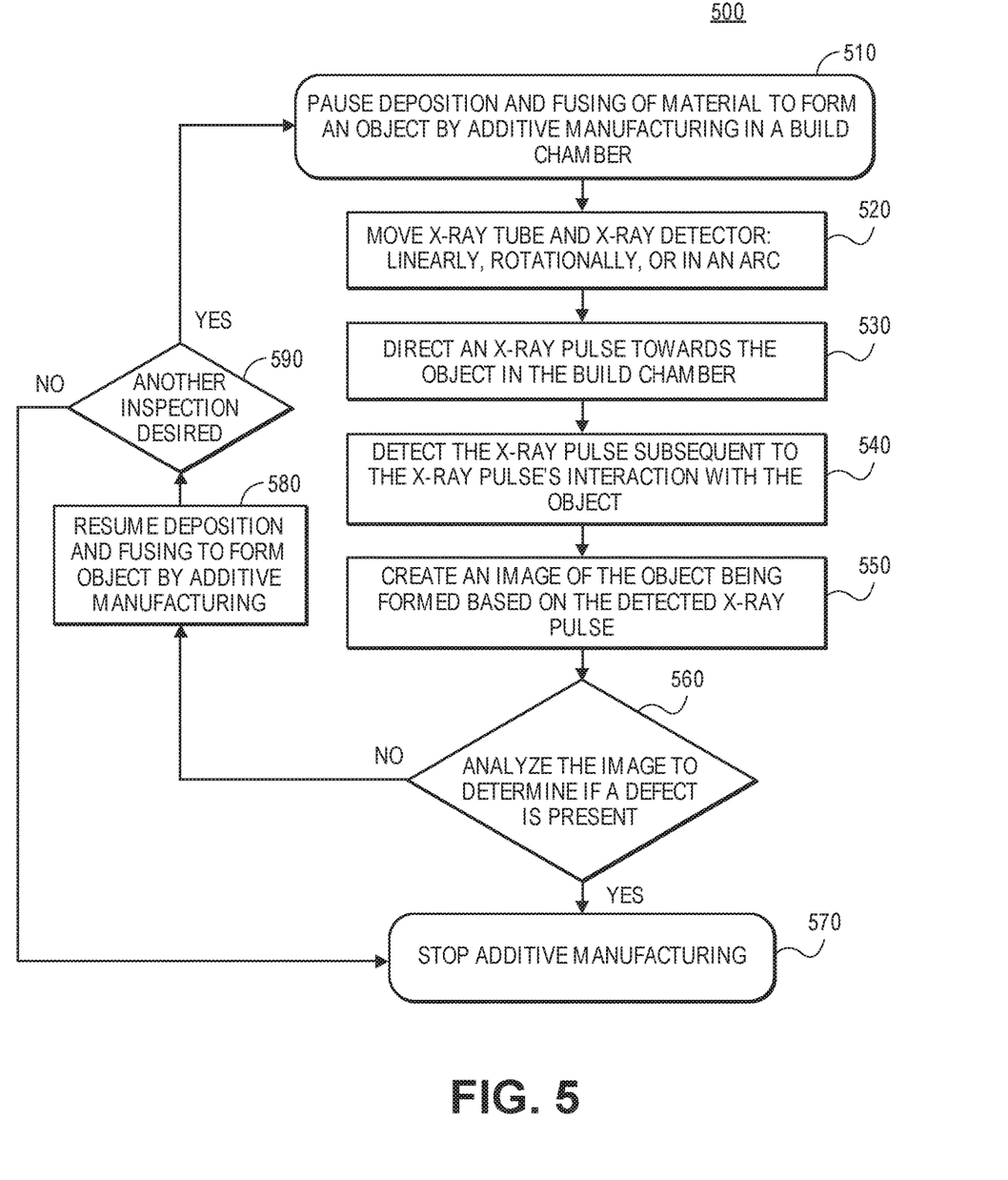
FIG. 5 illustrates operations performed in a method for real time inspection of an object during additive manufacturing of the object according to the present disclosure.

FIGS. 4 and 5 show another inspection system and method that can be used for real time inspection during additive manufacturing, according to the present disclosure. Instead of rotating the object being formed, here the object being formed is stationary while one or both of the x-ray tube and the linear x-ray detector array is moved. As before, the inspection system and method are described with reference to metal powder fed system 401. Metal powder fed system 401 includes a build chamber 460, a fabrication stand 430, a metal powder feeder 480, and a laser beam 482. Metal powder feeder 480 can include, for example, a nozzle mounted on a 4 or 5 axis arm. The type of laser can depend on the powdered metal being deposited. Because directed energy deposition systems often require an inert atmosphere, access to build chamber 460 during fabrication by additive manufacturing is limited. An x-ray tube 410, an aperture 420, a linear x-ray detector array 440, a computer 450, a controller 454, and an image analyzer 456 can be incorporated into metal powder fed system 401. The path and pulse shape of the x-ray pulse provided by x-ray tube 410 depicted in FIG. 4 as an x-ray pulse 411. Additionally, an x-ray tube actuator 405 can be used to move one or both of x-ray tube 410 and aperture 420. And, linear x-ray detector array aperture 406 can be used to move linear x-ray detector array 440.

In this system, fabrication stand 430 remains stationary and can support an object being fabricated 499. For example, x-ray tube 410 and linear x-ray detector array 440 can both move linearly. Alternatively, one of x-ray tube 410 and linear x-ray detector array 440 can rotate while the other moves in an arc to maintain a same relative distance between the two. Moving the x-ray tube and the linear x-ray detector array relative to the stationary fabrication stand can reduce disruption of the additive manufacturing process because the change in relative position of object being fabricated 499 to the positions of metal powder feeder 480 and laser beam 482 can be minimized.

To facilitate linear, arc, or rotational motion of one or both of x-ray tube 410 and linear x-ray detector array 440, actuators can be used. For example, x-ray tube 410 can be attached to x-ray tube actuator 405 that moves both x-ray tube 410 and aperture 420 in a linear manner, for example into and out of the page depicted in FIG. 4. Similarly, linear x-ray detector array 440 can be attached to linear x-ray detector array actuator 406 that also moves linearly, for example, into and out of the page of FIG. 4 and in a synchronized manner with the movement of x-ray tube 410 and aperture 420. Alternatively, linear x-ray detector array actuator 406 can rotate linear x-ray detector array 440 to match the movement of x-ray tube actuator 405 that moves both x-ray tube 410 and aperture 420 in arc. In another alternative, linear x-ray detector array actuator 406 can move linear x-ray detector array 440 in an arc to match the rotation of x-ray tube actuator 405 that rotates both x-ray tube 410 and aperture 420. By rotating one of x-ray tube 410 and linear x-ray detector array 440 and moving the other in an arc, the distance between the two can be maintained.

With reference to FIG. 4, inspection during additive manufacturing can proceed as shown in FIG. 5. A method 500 for real time inspection during additive manufacturing is similar to the method 200 shown in FIG. 2. In this case, controller 454 can control the speed, as well as the start and stop of the motion of both x-ray tube actuator 405 and linear x-ray detector array actuator 406. Controller 454 also synchronizes their movement to scan the entire volume of object being fabricated 499. The speed of movement of one or both actuators can depend on the size of object being fabricated 499 and/or the x-ray pulse width and can range from about 100 cm/sec to about 1 cm/min.

Method 500 is described herein with respect to a metal powder fed additive manufacturing system 401 shown in FIG. 4. One of ordinary skill in art will understand that reference to metal powder fed system 401 is for descriptive purposes and that the disclosed system and method can be used in other types of additive manufacturing systems and is not limited to additive manufacturing of metal objects.

At 510 of method 500 shown in FIG. 5, deposition and fusing of material to form an object by additive manufacturing is paused, for example, by stopping deposition of metal powder and turning off the laser that provides laser beam 482 or redirecting laser beam 482 away from object 499. Build chamber 460 does not need to be opened, the environment inside does not need to be changed, and object 499 does not need to be removed from the build chamber. This can minimize the amount of time the additive manufacturing process is paused.

At 520 of method 500, x-ray tube actuator 405 and linear x-ray detector array actuator 406 can move x-ray tube 410 and linear x-ray detector array 440, respectively, in a linear manner, for example, into and out of the page of FIG. 4. Controller 454 synchronizes the linear motion so the object being fabricated 499 is scanned by x-ray pulse 411 and subsequently detected by linear x-ray detector array 440. X-ray tube actuator 405 also moves aperture 420 in a synchronized manner with x-ray tube 410 and linear x-ray detector array 440.

Alternatively, at 520 of method 500, x-ray tube actuator 405 and linear x-ray detector array actuator 406 can rotate one of x-ray tube 410 and linear x-ray detector array 440, and the other of x-ray tube actuator 405 and linear x-ray detector array actuator 406 can move in an arc. This can maintain the distance between x-ray tube 410 and linear x-ray detector array 440. X-ray tube actuator 405 also moves aperture 420 in a synchronized manner with x-ray tube 410 and linear x-ray detector array 440. Controller 454 synchronizes the motion of aperture 420, x-ray tube 410, and linear x-ray detector array 440 so the object being fabricated 499 is scanned by x-ray pulse 411 and subsequently detected by linear x-ray detector array 440.

At 530 of method 500, an x-ray pulse is directed towards object 499 at the same time as x-ray tube actuator 405 moves x-ray tube 410 and aperture 420, and linear x-ray detector array actuator 406 moves linear x-ray detector array 440. In this manner, object 499 is scanned by the x-ray pulse as one or both of the x-ray tube and linear x-ray detector array are moved linearly, in an arc or rotated. The x-ray pulse can occur at a time $T_1$. Time $T_1$ is subsequent to a time $T_0$ and prior to a time $T_F$, wherein time $T_0$ is a start of additive manufacturing of object 499 and time $T_F$ is a completion of additive manufacturing of object 499 within build chamber 460. Referring to FIG. 4, x-rays are generated by x-ray tube 410. Linear aperture 420, under the control of controller 454, provides a collimated fan shaped x-ray pulse that interacts with object 499. The x-ray pulse can have a pulse duration of about 1 second to about 60 seconds and an energy of about 50 to about 250 keV. Current can range from about 1 to about 20 mA. The x-ray pulse duration allows x-rays to interact with the object being formed as the x-ray tube and/or linear x-ray detector array is being moved linearly or in an arc. The collimated fan beam can further have a length, for example, long enough to inspect object 499 at its largest dimensions when fabrication is completed.

At 540 of method 500, x-ray pulse 411 is detected by linear x-ray detector array 540. The speed of actuators 405 and 406 moving object 499 and the pulse width of x-ray pulse 411 allow linear x-ray detector array 440 to detect the x-rays subsequent to interaction with an entire volume of object 499. In other words, scanning of the entire volume of object 399 can be accomplished by controlling the pulse width and speed of actuators 405 and 406. The data collected by linear x-ray detector array 440 is sent to computer 450. At this point, controller 454 under the direction of computer 450 can stop motion of actuators 405 and 406.

At 550 of method 500, an x-ray image is created based on the x-rays detected by linear x-ray detector array 440. Using signals provided by linear x-ray detector array 440, an x-ray image representing a volume of object 499 can be created. The x-ray image can be, for example, a digital image created by image analyzer 456. The x-ray image is analyzed at 560 of method 500 by image analyzer 456. For example, image analyzer 456 can use pattern recognition to compare the x-ray image of object 499 to control image, for example, an x-ray image of an object with no defects. Defects of about 1 mm and larger can be detected.

If a defect is detected in object 499, additive manufacturing can be stopped at 570. Stopping the additive manufacturing process at this point, prior to completion of fabrication, can save time, material, and cost.

If a defect is not detected in object 499, the additive manufacturing can resume fabrication of object 499, as shown at 580 of method 500. Referring to FIG. 4, resuming additive manufacturing means that metal powder feeder 480 begins to deposit metal powder while laser beam 482 fuses the metal powder at the surface of object 499. One of ordinary skill in the art will understand that fabrication can resume at any time after detection of the x-rays by linear x-ray detector array 440. In other words, additive manufacturing can resume before completion of the analysis of whether a defect exists.

At 590 of method 500, fabrication of object 499 can continue to completion. If another inspection is desired, for example at a time $T_2$, where $T_2$ is subsequent to time $T_1$ and prior to time $T_F$, fabrication of object 499 can again be paused and can return to 510 of method 500 as shown in FIG. 5. Operations 510 thru 560 of method 500 can then be repeated as desired or until fabrication is complete. In other words, between time $T_0$ and $T_F$ and subsequent to $T_2$, x-rays can be directed at object 499 and x-ray images created as many times as desired. For example, subsequent to time $T_2$ and prior to time $T_F$, x-rays can be directed at object 499 and x-ray images created at a time $T_N$ where time $T_N$ is an integer greater than 2. For small or non-complex shapes, only one inspection may be desired. For a large or complex shape and/or for an object formed of expensive build materials, the additive manufacturing process can be paused and the object inspected, for example, 10 times so that 10 x-ray images are formed at times $T_1$ thru $T_{10}$, respectively. Furthermore, when during the fabrication process each of the pauses occurs can also be determined as desired. For example, $T_1$ (or $T_N$) can be set to occur after fabrication of a particularly complex portion of object 499. Additionally, the timing of multiple pauses of the additive manufacturing process and inspection of the object does not have to be evenly spaced and can occur any time during fabrication.

As disclosed herein, some or all of method 500 can be advantageously automated. For example, resuming or stopping the additive manufacturing process is accomplished without an operator by using, for example, computer 450, controller 454, and image analyzer 456. Determining whether a defect exists using image processing and pattern recognition software can increase consistency of results. If desired, however, a trained technician can be used to perform the inspection and/or determination of whether a defect exists.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. For example, steps of the methods have been described as first, second, third, etc. As used herein, these terms refer only to relative order with respect to each other, e.g., first occurs before second. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method for detecting defects during additive manufacturing comprising:
    pausing additive manufacturing of an object within a build chamber at a time $T_1$ after completion of forming a layer, wherein $T_1$ is subsequent to a time $T_0$ and prior to a time $T_F$, wherein time $T_0$ is a start of additive manufacturing of the object being formed and time $T_F$ is a completion of additive manufacturing of the object being formed in the build chamber;
    wherein the time $T_1$ is capable of being any and all points of time between $T_0$ and $T_F$;
    rotating the object in the build chamber;
    directing an x-ray pulse from an x-ray tube through a linear aperture towards the object being formed and rotated inside of the build chamber, wherein an opening of the linear aperture is positioned perpendicular to a plane of rotation of the object;
    detecting the x-ray pulse, by a linear x-ray detector array, subsequent to interaction of the x-ray pulse and the object being formed and rotated, the linear x-ray detector positioned to detect a cross section of an entirety of all of the additively manufactured layers of the object being formed; and
    creating an x-ray image of the object being formed based on the x-ray pulse that was detected.

2. The method of claim 1, further comprising:
    analyzing the x-ray image of the object being formed to determine a presence of a defect; and
    stopping additive manufacturing of the object being formed, prior to time $T_F$, based on the presence of the defect.

3. The method of claim 1, further comprising:
    pausing additive manufacturing of an object within a build chamber at a time $T_2$, wherein time $T_2$ is subsequent to time $T_1$ and prior to the time $T_F$;
    directing a second x-ray pulse, at time $T_2$, towards the object being formed inside of the build chamber while rotating the object being formed;
    detecting the second x-ray pulse, by the linear x-ray detector array, subsequent to interaction of the second x-ray pulse and the object being formed; and
    creating a second x-ray image of the object being formed based on the second x-ray pulse that was detected.

4. The method of claim 3, further comprising,
    analyzing the second x-ray image of the object being formed to determine a presence of a defect, and
    stopping additive manufacturing of the object being formed, prior to time $T_F$, based on the presence of the defect.

5. The method of claim 3, further comprising:
    pausing additive manufacturing of an object within a build chamber at a time $T_N$, wherein time $T_N$ is subsequent to time $T_2$ and prior to a time $T_F$, wherein N is an integer greater than 2;
    directing an $N^{th}$ x-ray pulse, at time $T_N$, towards the object being formed inside of the build chamber while rotating the object being formed;
    detecting the $N^{th}$ x-ray pulse, by the linear x-ray detector array, subsequent to interaction of the $N^{th}$ x-ray pulse with the object being formed; and
    creating another x-ray image of the object being formed based on the $N^{th}$ x-ray pulse that was detected.

6. The method of claim 1, further comprising:
    analyzing the x-ray image of the object being formed to determine that a defect is not present; and
    resuming additive manufacturing of the object being formed.

7. The method of claim 1, wherein rotating the object in the build chamber comprises using a turntable to rotate the object from one revolution per second to one revolution per 10 minutes.

8. The method of claim 1, wherein analyzing the x-ray image of the object being formed to determine a presence of a defect comprises using pattern recognition to determine the presence of the defect.

9. A method for detecting defects during additive manufacturing comprising:
    pausing additive manufacturing of an object within a build chamber at a time $T_1$ after completion of forming a layer, wherein $T_1$ is subsequent to a time $T_0$ and prior to a time $T_F$, wherein time $T_0$ is a start of additive manufacturing of the object being formed and time $T_F$ is a completion of additive manufacturing of the object being formed in the build chamber;
    wherein the time $T_1$ is capable of being any and all points of time between $T_0$ and $T_F$;
    moving linearly the object in the build chamber in a direction perpendicular to an opening of a linear aperture and a detection axis of a linear x-ray detector array, wherein the linear aperture and the linear x-ray detector array are disposed outside of the build chamber;
    directing an x-ray pulse from an x-ray tube through the linear aperture towards the object being formed and moved inside of the build chamber to irradiate a cross-section of an entirety of all of the manufactured layers of the object being formed;

detecting the x-ray pulse, by the linear x-ray detector array, subsequent to the x-ray pulse irradiating the cross-section of the entirety of the object being formed; and creating an x-ray image of the object being formed based on the x-ray pulse that was detected.

10. The method of claim 9, further comprising:
analyzing the x-ray image of the object being formed to determine a presence of a defect; and
stopping additive manufacturing of the object being formed, prior to time $T_F$, based on the presence of the defect.

11. The method of claim 9, further comprising:
pausing additive manufacturing of an object within a build chamber at a time $T_2$, wherein time $T_2$ is subsequent to time $T_1$ and prior to the time $T_F$;
directing a second x-ray pulse, at time $T_2$, towards the object being formed inside of the build chamber while moving linearly the object being formed;
detecting the second x-ray pulse, by the linear x-ray detector array, subsequent to interaction of the second x-ray pulse and the object being formed; and
creating a second x-ray image of the object being formed based on the second x-ray pulse that was detected.

12. The method of claim 9, wherein moving linearly the object in the build chamber comprises using a linear actuator to move the object from 100 cm/second to 1 cm/minute.

13. An inspection system for additive manufacturing comprising:
an actuator, wherein the actuator is arranged in a build chamber to support an object being formed by additive manufacturing;
an x-ray tube disposed adjacent to a side of the actuator and outside of the build chamber;
a linear aperture disposed between the x-ray tube and the build chamber;
a linear x-ray detector array disposed at an opposite side of the actuator from the x-ray tube and outside of the build chamber, wherein a length of the linear x-ray detector array is positioned parallel to a build direction of the object being formed and positioned to detect a cross section of an entirety of all additively manufactured layers of the object being formed,
wherein the actuator, the x-ray tube, the linear aperture, and the linear x-ray detector array are configured to:
pause at a time Ti after completion of forming a layer, wherein $T_1$ is subsequent to a time $T_0$ and prior to a time $T_F$, wherein time $T_0$ is a start of additive manufacturing of the object being formed and time $T_F$ is a completion of additive manufacturing of the object being formed in the build chamber and wherein the time $T_1$ is capable of being any and all points of time between $T_0$ and $T_F$,
rotate the object in the build chamber,
direct an x-ray pulse from the x-ray tube through the linear aperture towards the object being formed inside of the build chamber, wherein an opening of the linear aperture is positioned perpendicular to a plane of rotation of the object, and detect the x-ray pulse, by the linear x-ray detector array, subsequent to interaction of the x-ray pulse and the object being formed and rotated;
and a computer and an image analyzer comprising a memory system having one or more non-transitory computer readable media storing instructions that, when executed, causes the image analyzer to form an x-ray image from signals received from the linear x-ray detector array.

14. The inspection system of claim 13, wherein the memory system comprising one or more non-transitory computer readable media storing instructions that, when executed, further causes the image analyzer to compare the x-ray image to a control image.

15. The inspection system of claim 13, further comprising a controller that synchronizes movement of the actuator, a pulse width of an x-ray pulse provided by the aperture, and an exposure time of the linear x-ray detector array.

16. The inspection system of claim 13, wherein the x-ray tube has a power ranging from 100 to 4000 watts and a voltage ranging from 30 to 450 kV.

17. The inspection system of claim 13, wherein the aperture comprises a linear aperture arranged to provide a collimated fan beam having a pulse duration ranging from 1 second to 60 seconds.

18. The inspection system of claim 13, wherein the actuator comprises a turntable capable of rotating at a speed ranging from one revolution per second to one revolution per 10 minutes.

19. The inspection system of claim 13, wherein the actuator comprises a linear actuator capable of moving at a speed ranging from 10 cm/second to 1 cm/minute.

20. An inspection system for additive manufacturing comprising:
an x-ray tube disposed adjacent to a side and outside of a build chamber;
a linear aperture disposed between the x-ray tube and the build chamber, wherein the x-ray tube and the linear aperture are attached to an x-ray tube actuator arranged to move the x-ray tube and the linear aperture relative to the build chamber;
a linear x-ray detector array disposed at an opposite side of the build chamber from the x-ray tube and outside of the build chamber, wherein the linear x-ray detector array is attached to a linear x-ray detector array actuator arranged to move the linear x-ray detector array relative to the build chamber, and wherein a length of the linear x-ray detector array is positioned parallel to a build direction within the build chamber formed and positioned to detect a cross section of an entirety of all additively manufactured layers of the being formed,
wherein the x-ray tube, the linear aperture, the x-ray tube actuator, and the linear x-ray detector array are configured to:
pause additive manufacturing of an object within the build chamber at a time $T_1$ after completion of forming a layer, wherein $T_1$ is subsequent to a time $T_0$ and prior to a time $T_F$, wherein time $T_0$ is a start of additive manufacturing of the object being formed and time $T_F$ is a completion of additive manufacturing of the object being formed in the build chamber, wherein the time $T_1$ is capable of being any and all points of time between $T_0$ and $T_F$,
rotate the x-ray tube or the linear x-ray detector array,
move in an arc the other of the x-ray tube and the linear x-ray detector array to maintain a distance between the linear x-ray detector array and the x-ray tube, wherein the x-ray tube and the linear x-ray detector array are disposed outside of the build chamber, direct an x-ray pulse from the x-ray tube through the linear aperture towards the object being formed to scan the object being formed, and
wherein a detection axis of the linear x-ray detector is perpendicular to the arc to detect a cross section of an entirety of all of the additively manufactured layers of the object being formed;

and a computer and an image analyzer comprising a memory system having one or more non-transitory computer readable media storing instructions that, when executed, causes the image analyzer to form an x-ray image from signals received from the linear x-ray detector array.

21. The inspection system of claim 20, wherein the x-ray tube actuator is arranged to move the x-ray tube linearly and wherein the linear x-ray detector array actuator is arranged to move the linear x-ray detector array linearly and in synchronization with the x-ray tube.

22. The inspection system of claim 20, wherein one of the x-ray tube actuator and the linear x-ray detector array actuator is arranged to rotate at a speed ranging from one revolution per second to one revolution per 10 minutes.

23. A method for detecting defects during additive manufacturing comprising:
pausing additive manufacturing of an object within a build chamber at a time $T_1$ after completion of forming a layer, wherein $T_1$ is subsequent to a time $T_0$ and prior to a time $T_F$, wherein time $T_0$ is a start of additive manufacturing of the object being formed and time $T_F$ is a completion of additive manufacturing of the object being formed in the build chamber;
wherein the time $T_1$ is capable of being any and all points of time between $T_0$ and $T_F$;
moving an x-ray tube and a linear x-ray detector array in a linear and synchronized manner, wherein the x-ray tube and the linear x-ray detector array are disposed outside of the build chamber;
directing an x-ray pulse from the x-ray tube through a linear aperture towards the object being formed to irradiate a cross-section of an entirety of all of the additively manufactured layers of the object being formed;
detecting the x-ray pulse, by the linear x-ray detector array, subsequent to the x-ray pulse irradiating the cross-section of the entirety of all of the additively manufactured layers of the object being formed;
and creating an x-ray image of the object being formed based on the x-ray pulse that was detected.

24. The method of claim 23, further comprising:
analyzing the x-ray image of the object being formed to determine a presence of a defect; and
stopping additive manufacturing of the object being formed, prior to time $T_F$, based on the presence of the defect.

25. The method of claim 23, further comprising:
pausing additive manufacturing of an object within a build chamber at a time $T_2$, wherein time $T_2$ is subsequent to time $T_1$ and prior to the time $T_F$;
directing a second x-ray pulse, at time $T_2$, towards the object being formed inside of the build chamber while moving the linear aperture and the linear x-ray detector in linear and synchronized manner;
detecting the second x-ray pulse, by the linear x-ray detector array, subsequent to interaction of the second x-ray pulse and the object being formed; and
creating a second x-ray image of the object being formed based on the second x-ray pulse that was detected.

26. A method for detecting defects during additive manufacturing comprising:
pausing additive manufacturing of an object within a build chamber at a time $T_1$ after completion of forming a layer, wherein $T_1$ is subsequent to a time $T_0$ and prior to a time $T_F$, wherein time $T_0$ is a start of additive manufacturing of the object being formed and time $T_F$ is a completion of additive manufacturing of the object being formed in the build chamber;
wherein the time $T_1$ is capable of being any and all points of time between $T_0$ and $T_F$;
rotating one of an x-ray tube and a linear x-ray detector array;
moving in an arc the other of the x-ray tube and the linear x-ray detector array to maintain a distance between the linear x-ray detector array and the x-ray tube, wherein the x-ray tube and the linear x-ray detector array are disposed outside of the build chamber;
directing an x-ray pulse from the x-ray tube through a linear aperture towards the object being formed to scan the object being formed;
detecting the x-ray pulse, by the linear x-ray detector array, subsequent to the x-ray pulse scanning the object being formed, wherein a detection axis of the linear x-ray detector is perpendicular to the arc to detect a cross section of an entirety of all of the additively manufactured layers of the object being formed;
and creating an x-ray image of the object being formed based on the x-ray pulse that was detected.

27. The method of claim 26, further comprising:
analyzing the x-ray image of the object being formed to determine a presence of a defect; and
stopping additive manufacturing of the object being formed, prior to time $T_F$, based on the presence of the defect.

* * * * *